Oct. 17, 1950     B. A. KNAUTH     2,525,914
APPARATUS FOR STROBOSCOPICALLY INDICATING
THE FLOW OF FLUIDS
Filed Aug. 21, 1947     2 Sheets-Sheet 1
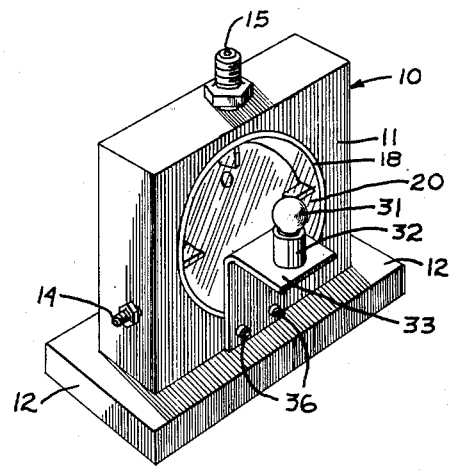
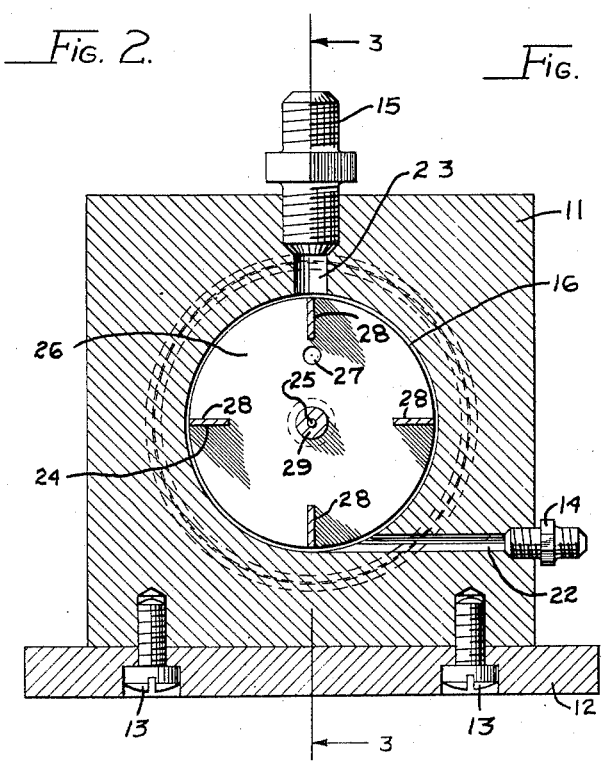
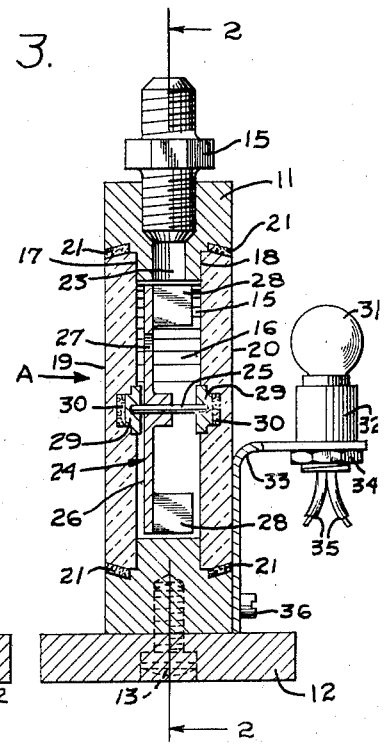
INVENTOR.
BERTHOLD A. KNAUTH
BY
Semmes, Keegin, Robinson & Semmes
ATTORNEYS

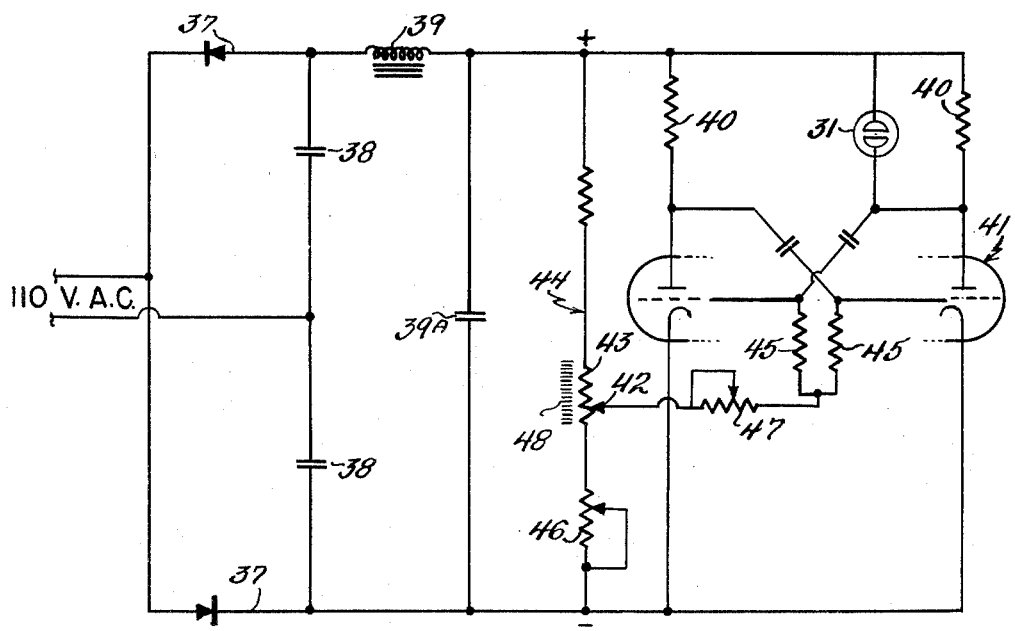

Patented Oct. 17, 1950

2,525,914

UNITED STATES PATENT OFFICE 2,525,914

APPARATUS FOR STROBOSCOPICALLY INDICATING THE FLOW OF FLUIDS

Berthold A. Knauth, Bolton, N. Y., assignor to Flowmeter Corporation of America, High Falls, N. Y., a corporation of New York Application August 21, 1947, Serial No. 769,923

6 Claims. (Cl. 73—229)

The present invention relates to flow indicators and has particular reference to a flow indicator which is designed to operate on the stroboscopic principle.

An object of the present invention is to provide a flow indicator which functions on the basis of producing a stroboscopic effect and in which the operator maintains a rate of flow by observing similar virtual image effects for similar rates of flow.

A further object is to provide a flow indicator in which the variations in the stroboscopic effect are utilized to indicate the rate of flow of any fluid system at any given time.

A further object is to provide a flow indicator of the type described which is economical to manufacture and which can be constructed of any size to accommodate any size fluid flow system and yet operate with equal efficiency and accuracy in all sizes.

Other objects and advantages of the invention will be apparent from the following detailed description, which is set forth for the purpose of explaining the invention, since it is understood that various changes may be made therein by those skilled in the art without departing from the spirit of the invention.

In the accompanying drawings which show a preferred embodiment of the invention:

Fig. 1 is a perspective view showing the flow indicator of the present invention;

Fig. 2 is a longitudinal vertical section of the flow indicator taken along the line 2—2 of Fig. 3; and Fig. 3 is a transverse vertical section taken along the line 3—3 of Fig. 2.

Fig. 4 shows a suitable circuit for use with the device.

In its broadest concept, the invention provides for the production of a stroboscopic effect which varies with the varying rates of flow of fluid. The preferred means for carrying out the invention comprises a turbine rotor which includes a disc having a single aperture which is mounted for free rotation between transparent panes which form a part of the turbine housing. A gas discharge lamp is mounted in a manner so that its intermittent light may be viewed through the panes and aperture, the number of virtual images of the aperture with respect to the frequency of the lamp indicating the R. P. M. of the rotor which in turn will be an indication of the rate of flow of the fluid through the turbine.

More specifically, the preferred embodiment of the flow indicator 10, is shown in Fig. 1, comprises a housing 11 secured to a base 12 by bolts 13. A fluid inlet fitting is shown at 14 and a fluid outlet fitting 15 extends through the top of the housing.

The housing 11 is formed with a transverse through hole 16 which constitutes a circular turbine chamber. Counterbores 17 and 18 are situated at opposite ends of the through-hole. A transparent window pane 19 is hermetically sealed in the counterbore 17. A similar window pane 20 is sealed in the counterbore 18. Any sealing material 21, depending on the chemical properties of the fluid flowing through the indicator, is suitable to properly seal the transparent panes within the counterbores. Where the instrument is to be used to measure the rate of flow of a liquid under high pressure, other, more positive, means should be provided to hold the panes in place.

The fluid inlet fitting 14 enters upon a channel 22 which communicates with the through hole 16 at the bottom tangentially to its circumference. An exhaust channel 23 is bored radially in the housing at the top to connect with outlet fitting 15. The exhaust channel 23 and outlet fitting 15 are shown to be larger than the inlet channel 22 and inlet fitting 14 in order to eliminate constrictive forces as the fluid passes through the indicator and to decrease the resistance which such an instrument as a flow indicator might introduce into a flow system.

A rotor 24 is located within the through-hole and mounted on a shaft 25. The rotor includes a disc 26 having a single aperture 27 and a number of radial vanes 28 normal to the plane of the rotor and adjacent the periphery of the rotor.

The ends of the shaft 25 are supported rotatably in two axially aligned bearings 29 which are mounted in the respective panes 19 and 20. Resilient cementitious material at 30 may seal the bearings 29 in the panes.

An intermittent voltage lamp, or as herein preferred, a gas discharge lamp 31 is mounted in a socket 32 which is secured to angle bracket 33 by a nut 34. Wires 35 provide current for the lamp 31. Bolts 36 secure angle bracket 33 to the housing 11. The gas discharge lamp is mounted in such a manner with regard to the window panes 19 and 20 that its light may be viewed through the aperture 27 in the rotor 24 from A. It has been found through experiment that the source of light should be at some distance from the windows and that the interposition of a diffusion glass between the light source and the window is helpful.

It is to be noted that while the apertured disc and gas discharge bulb provide a simple and effective means to create this light effect, substantially similar results could be obtained by reflecting the intermittent light from a reflector spot on the disc or by providing a spot of fluorescent material on the disc and a light source, such as ultra-violet energized by periodic voltage which would cause the spot to fluoresce.

In operation, fluid entering the inlet fitting 14 causes the rotor to revolve. Since this fluid impinges upon the vane 28 of the rotor nearest the inlet channel 22, this vane is driven away from the inlet fitting. The incoming fluid also reacts directly against the body of the fluid in the interior of the housing 11 until the rotor and the fluid in the chamber revolve as a unit. An amount of fluid equal to that entering the inlet fitting 20 leaves the housing through the exhaust fitting 15, thus keeping the fluid in continued motion.

If the discharge lamp 31 is now connected to a source of intermittent voltage of a frequency necessary to operate the lamp a given number of times per second or other unit of time, the aperture 27 will be visible at a certain number of times in the revolution of the rotor. In this manner, virtual images of the aperture are created, and the number of such images is proportional to the frequency of the voltage source divided by the rotational speed of the rotor. By way of example, if the illumination came from the discharge lamp at the rate of 60 times per second, then the appearance of 4 virtual images would mean that the rotor was revolving at the rate of $$\frac{60 \times 60}{4} = 900$$

revolutions per minutes.

The speed of rotation of the rotor in the above example could, if the rotor made 1¼ revolutions between successive flashes, be 4500 R. P. M. Similarly, it might be 8100 R. P. M. if the rotor made 2¼ revolutions between successive flashes of light. The actual speed may be determined from the formula:

$$\mathrm{RPM} = F_n + \frac{F}{i}$$

where

RPM = revolutions/min.
F = frequency of light in cycles/min.
$n$ = No. of complete revolutions of the rotor between flashes of light
$i$ = No. of images It will, therefore, be necessary to know $n$, the number of complete revolutions of the rotor between successive flashes of light, or the approximate speed of the rotor. If a light source having a frequency of 60 cycles per second is used, the possible speeds indicated by one certain number of images will vary by multiples of 3600 R. P. M. Ordinarily, the operator will know the speed of the rotor within 3600 R. P. M.; consequently, the usefulness of the instrument is not seriously impaired by this characteristic.

If the amount of fluid passing through the indicator is carefully measured and noted, then identical conditions of rate of flow of fluid can be established at any time by simply connecting the lamp to the same voltage frequency and adjusting the rate of flow until the four stationary virtual images are again observed. Other multiples of the light frequency may be used with equal accuracy of indication. If the frequency of the light source be variable, it is a simple matter to read the frequency on the scale and determine the rate of flow of fluid through the indicator in the same manner as in the above example.

Careful research has shown that when the indicator is made according to the instructions herein contained, the rate of fluid flow and the speed of rotation of the rotor have a linear relationship over a very wide range of flow rates when plotted on a chart. Thus it is possible to calibrate accurately an indicator by measuring the rate of flow of fluid at one light frequency and one image only. All other rates for that particular indicator may be extrapolated from that one point on a straight line in either direction, one end of the line being determined by the origin of the graph.

By varying the size of the indicator thus described and its inlet and exhaust fittings, almost any rate of flow of a fluid can be accommodated. Since these exists no parallax error in reading, changes in the rate of flow of a fluid as small as 1/20th of one revolution per minute can be easily noted. In the above example, a change of flow as small as 5% would be readily indicated.

By the use of this indicator rates of flow can be maintained within the above limits for long periods of time, hours or days, if necessary. Since this degree of accuracy is not approached by other known methods of measurement, this device provides a valuable instrument in the field of research and industry.

In addition, when equipped with a calibrated, variable frequency source of lighting, this indicator can be used as a most accurate flow meter. In that case it will be only necessary to install the meter in a flow system, adjust the frequency of the light until a standard image is seen, and read the rate of flow directly from a scale.

A suitable means for energizing and regulating the frequency of the light 31 may comprise a multivibrator such as illustrated in Figure 4. Multivibrators are well known in the art, and description of the operation is not thought necessary. The circuit, as applied to the present purpose, might briefly be described, however.

As shown in Figure 4, 110 volt A. C. current is rectified by a full wave voltage doubler consisting of two half-wave rectifiers 37 and condensers 38. A smoothing filter comprising a series choke 39 and a shunt condenser 39A is provided to reduce voltage ripple. The positive rectified voltage is applied through fixed resistors 40 respectively to the two plates of a double triode 41 in a typical free running multivibrator circuit. The negative voltage is applied to the cathodes of the tube 41. The grid returns of the multivibrator circuit are connected to the slider 42 of a potentiometer 43 which forms a part of a voltage divider 44. It will be seen, therefore, that movement of the potentiometer slider 42 will vary the voltage on the grid resistors 46 and thereby change the frequency of oscillation of the multivibrator. Variable compensating resistors 46 and 47 may be provided to adjust the circuit to desired conditions.

The light 31 may be a standard 110 volt neon glow lamp and is connected across the plate resistor 40 of one-half of the double triode 42 so that when this half of the tube is conducting, the lamp will be energized. Thus a series of light pulses may be produced whose frequency may be varied over a wide range of adjustments by the potentiometer 43. The slider 42 of the potentiometer may be provided with a calibrated scale 48 graduated in revolutions per minute or other suitable values.

The device of the present invention is of simple design, is easily constructed and has the advantage of being readily installed within a fluid flow system at almost any point. At the same time, it is extremely accurate and readable with accuracy by an operator standing at a great distance from the indicator, eliminating the need for extended piping to bring the indicator closer to an operator. Where a standard rate of flow is desired, a mere cursory glance from across a room could inform an operator instantly if the rate of flow of fluid has increased or decreased from that standard.

Having thus described the invention, it is obvious that various immaterial modifications may be made in the same without departing from the spirit of the invention, hence it is to be understood that this disclosure does not limit itself to the exact form, construction, arrangement and combination of parts herein shown and described.

I claim:

1. A flow indicator comprising a casing having an inlet and an outlet, a rotor mounted for free rotation in the casing by the action of fluid flowing between said inlet and outlet, said rotor including a disc coaxial with the axis of rotation of the rotor and having a single relatively small index means radially displaced from said axis, said casing having an opening coaxial with said disc and having a transparent pane closing the same, the area of said opening being at least equal to the circle described by said index means as the disc revolves whereby said index means may be directly viewed through the pane in all rotative positions of the disc, a light means positioned relatively to the disc to illuminate at least the area of the circle described by the rotating index means, and means supplying periodic voltage pulses at predetermined frequency connected to said light means to energize the same and transmit light pulses to said index means at said frequency and thereby stroboscopically indicate the speed of rotation of the rotor as a function of the rate of flow of the fluid through said casing.

2. A flow indicator of the character set forth in claim 1 in which said voltage supplying means includes means for varying the frequency of said periodic voltage pulses.

3. A flow indicator comprising a casing having an inlet and an outlet, a rotor mounted for free rotation in the casing by action of fluid flowing between said inlet and outlet, said rotor including an opaque disc coaxial with the axis of rotation of the rotor and having a single aperture radially displaced from said axis, said casing having an opening coaxial with said disc and a transparent pane closing the same and facing one side of said disc, the area of said opening being at least equal to the circle described by said aperture as the disc rotates whereby the aperture may be directly viewed through said pane in all rotative positions of the disc, a light means positioned adjacent the opposite side of the disc and relatively thereto to transmit light through said aperture and pane in all rotative positions of the disc, and means supplying periodic voltage pulses at predetermined frequency connected to said light to energize the same and transmit light pulses at said frequency through said aperture and pane and thereby stroboscopically indicate the speed of rotation of said rotor as a function of the rate of flow of the fluid through said casing.

4. A flow indicator of the character set forth in claim 3 in which said voltage supplying means includes means for varying the frequency of said periodic voltage pulses.

5. A flow indicator comprising a casing having an inlet and an outlet, a rotor mounted for free rotation in the casing by action of fluid flowing between said inlet and outlet, said rotor including an opaque disc coaxial with the axis of rotation of the rotor and having a single aperture radially displaced from said axis, said casing having opposed openings coaxial with said disc, the disc lying between said openings, a transparent pane closing each opening, each opening having an area at least equal to the circle described by said aperture as the disc rotates whereby said aperture will be in registration with said openings in all rotative positions of the disc, a light means positioned exteriorly of the casing and relatively to one of said panes to be viewed through said panes and aperture in all rotative positions of the disc, and means supplying periodic voltage pulses at predetermined frequency connected with the light means to energize the same and produce light pulses at said frequency to be viewed as aforesaid and thereby stroboscopically indicate the rotational speed of said rotor as a function of the rate of flow of the fluid.

6. A flow indicator of the character set forth in claim 5 in which said voltage supplying means includes means for varying the frequency of said periodic voltage pulses.

BERTHOLD A. KNAUTH.

REFERENCES CITED

The following references are of record in the file of this patent:

UNITED STATES PATENTS

| Number | Name | Date |
| --- | --- | --- |
| 1,813,349 | Eickmeyer | July 7, 1931 |
| 2,204,463 | Allen | June 11, 1940 |
| 2,209,700 | Mayo et al. | July 30, 1940 |
| 2,310,092 | Knowles et al. | Feb. 2, 1943 |
| 2,326,169 | Piquerez | Aug. 10, 1943 |
| 2,411,613 | Bryant | Nov. 26, 1946 |